United States Patent [19]

Fernandez et al.

[11] Patent Number: 4,676,947
[45] Date of Patent: Jun. 30, 1987

[54] DEVICE FOR THERMAL PROTECTION OF A COMPONENT OF A FAST-NEUTRON NUCLEAR REACTOR

[75] Inventors: Luis Fernandez, Palaiseau; Christian Mauget, Bondoufle, both of France

[73] Assignee: NOVATOME, Le Plessis Robinson, France

[21] Appl. No.: 665,854

[22] Filed: Oct. 29, 1984

[30] Foreign Application Priority Data

Oct. 28, 1983 [FR] France ................................ 83 17280

[51] Int. Cl.⁴ ................................................ G21C 9/00
[52] U.S. Cl. ..................................... 376/290; 376/291; 376/292; 376/402; 376/403; 376/404; 376/405
[58] Field of Search ............... 376/290, 291, 292, 402, 376/403, 404, 405

[56] References Cited

U.S. PATENT DOCUMENTS 4,464,334 8/1984 Artaud et al. ........................ 376/290

FOREIGN PATENT DOCUMENTS 2283521 3/1976 France ................................ 376/290

Primary Examiner—Deborah L. Kyle
Assistant Examiner—Richard W. Wendtland
Attorney, Agent, or Firm—Pollock, Vande Sande & Priddy

[57] ABSTRACT

The invention relates to a device for thermal protection of a component of a fast-neutron nuclear reactor consisting of at least one shell (10, 11) of a diameter smaller than the diameter of the passage (2) for the component (4) but greater than the diameter of the component (4). The length of the shell (10, 11) fixed under the flange (5) of the component (4) is greater than the slab thickness (1). Circulation of blanket gas (13) is established in the annular space (7) between the component (4) and the passage (2).

The invention applies in particular to nuclear reactors cooled with liquid sodium whose upper level is under an argon blanket.

8 Claims, 5 Drawing Figures

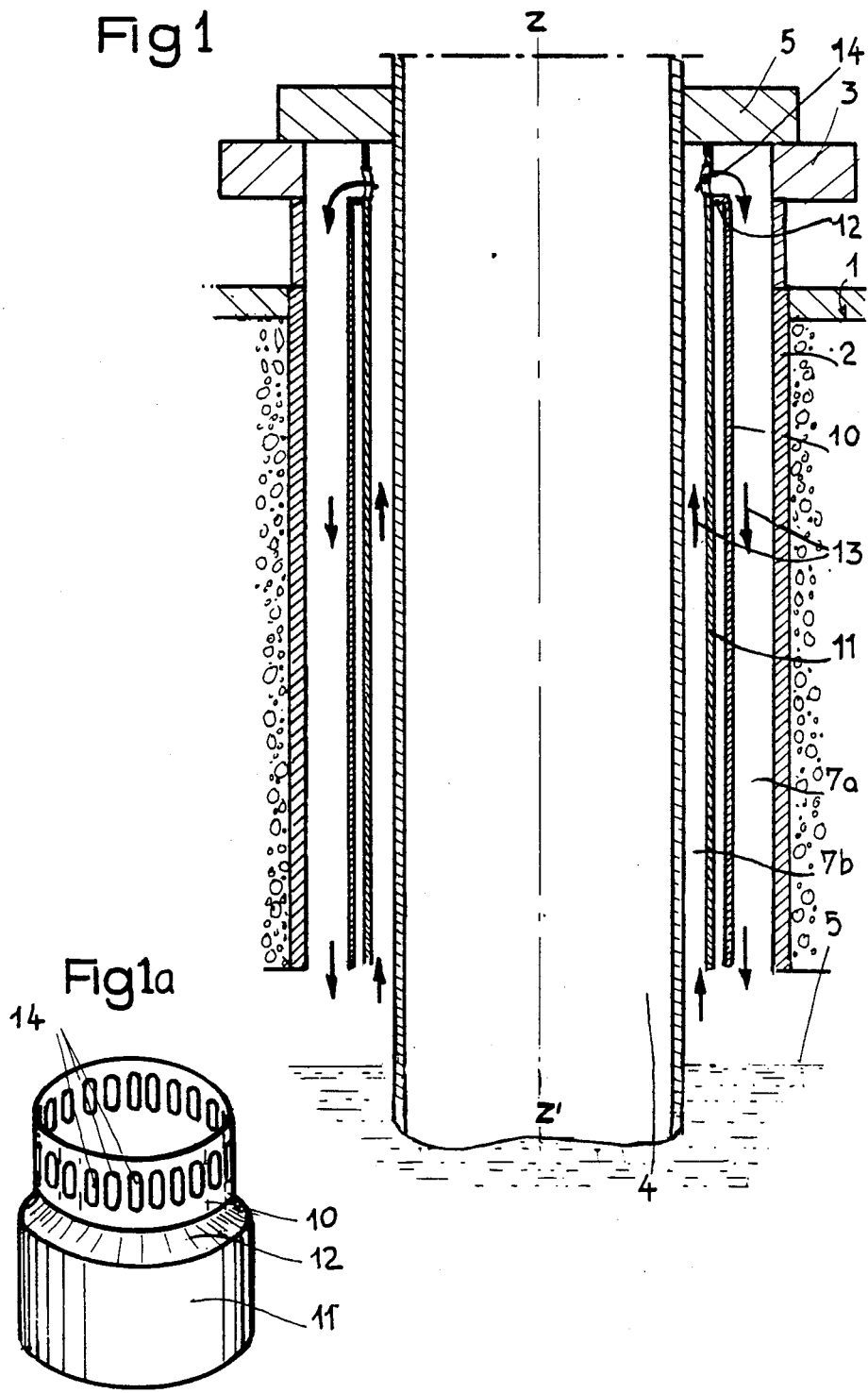

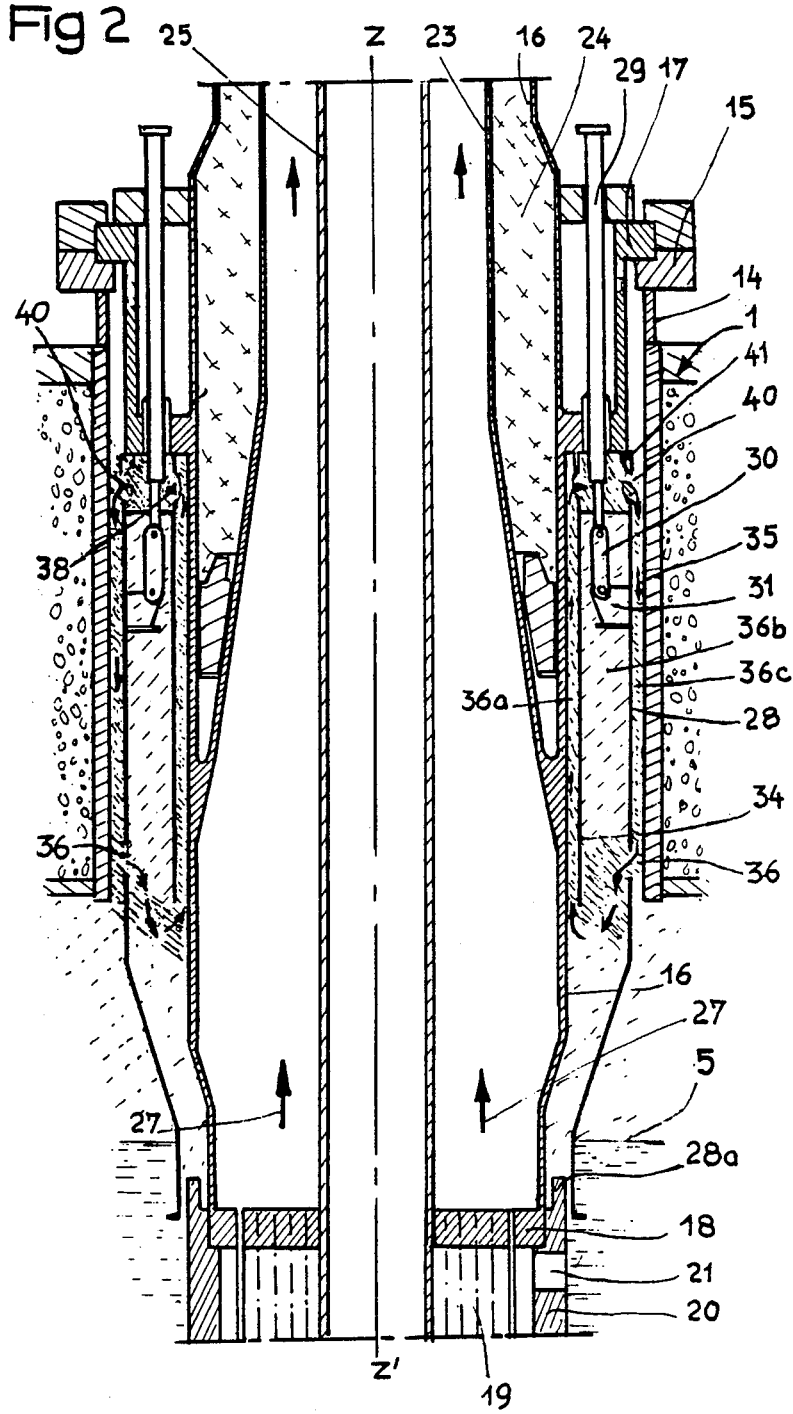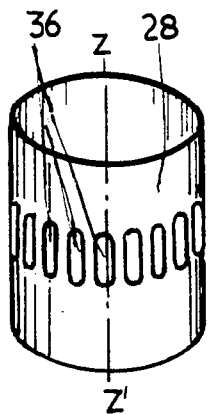

4,676,947

DEVICE FOR THERMAL PROTECTION OF A COMPONENT OF A FAST-NEUTRON NUCLEAR REACTOR

FIELD OF THE INVENTION

The invention relates to a device for thermal protection of a component of a fast-neutron nuclear reactor with circulation of blanket gas between the component and the reactor slab.

BACKGROUND OF THE INVENTION

Fast-neutron nuclear reactors incorporate a large vessel having a vertical axis, filled with liquid metal up to a certain level and closed with a horizontal slab. The volume included between the top level of the liquid metal, which is generally sodium, and the slab is filled with an inert blanket gas, which may be argon. This argon, at a slight overpressure relative to the atmosphere, makes it possible to avoid any entry of air into the vessel of the nuclear reactor and any contact of the liquid sodium with an oxygen-containing gas.

The thick horizontal slab of the nuclear reactor consists of a metal casing filled with concrete. Inside this casing are arranged cylindrical passages having a vertical axis permitting the components of the reactor to be passed. These components are of very diverse sizes and constructions depending on their use in the vessel of the nuclear reactor. All these components have their lower part immersed in the liquid sodium which fills the vessel.

In particular, the primary pumps and the intermediate exchangers of the reactor are formed in the shape of wide-diameter components of a generally cylindrical shape and great length, arranged in the vessel with their axis vertical.

All these components incorporate in their top part a bearing flange which rests on the reactor slab to hold the component in an operating position in the reactor vessel.

The component passages which are arranged through the slab have an inner diameter which is appreciably greater than the diameter of the component part which is at the level of this passage in its working position. An annular space of a relatively large width is thus provided between the component and the slab.

Some components such as the intermediate exchangers, have their outer wall, in the region of the passage through the slab, at a very high temperature when the reactor is operating. An intermediate exchanger, in fact, forms an enclosure inside which secondary liquid sodium at a high temperature, above 500° C., circulates upwards in contact with the outer wall of the exchanger.

Other components such as pumps, on the other hand, have a wall the temperature of which remains relatively moderate in the zone of the passage through the slab. In all cases, however, the outer surface of the component whose lower part is immersed in the liquid sodium is at a temperature which is considerably higher than the temperature of the slab, which is in the region of 100°, at the level of the passages for the components.

Heat exchange phenomena are therefore produced between the components and the reactor slab, in the annular space which exists between the component and the passage.

These heat exchanges by radiation and by convection produce locally heating of the slab structure and, more particularly, of the passage, which gives rise to internal stresses in this slab and can cause distortions of its structure. Furthermore, the inert blanket gas entering the annular spaces between the components and the slab tends to increase the thermal exchanges, while promoting the formation of hot zones in the passages through the slab, by local circulation between the component and the passage. It would obviously be desirable to prevent this appearance of high-temperature zones and to obtain as uniform a temperature as possible in the passages through the slab by channelling the flow of the blanket gas in the annular spaces between the components and the slab.

SUMMARY OF THE INVENTION

The aim of the invention is therefore to offer a device for thermal protection of a component of a fast-neutron nuclear reactor, with circulation of blanket gas between the component and the reactor slab, the nuclear reactor incorporating a vessel filled with liquid metal under a layer of neutral blanket gas and closed by a slab pierced with cylindrical passages having a vertical axis, through each of which the lower part of a long component, arranged with its axis vertical and equipped with a flange for bearing on the slab, enters the reactor vessel, the diameters of the components and of the passage through the slab being provided so that an annular space is arranged between the component and the slab, a device which makes it possible to obtain restricted heating of the passages through the slab and an almost uniform temperature of these passages, while being of a very simple construction permitting easy installation of the component on the slab.

To this end, the protective device consists of at least one shell of a diameter smaller than the inner diameter of the passage but greater than the diameter of the component in its part situated in the passage, of a length greater than the length of the passage, i.e., the slab thickness, linked to the bearing flange of the component in its top part so as to divide the annular space between the component and the passage into two annular spaces communicating with each other only in the vicinity of the lower part of the slab and in the upper part of the shell, below the bearing flange of the component, by at least one set of openings passing through the shell in an annular zone of the latter, with a vertical axis.

BRIEF DESCRIPTION OF THE DRAWINGS

In order that the invention may be more clearly understood, a description will now be given, by way of non-limiting examples, with reference to the attached drawings, of two embodiments of a device for thermal protection according to the invention, in the case of a primary pump and in the case of an intermediate exchanger.

FIG. 1 is a diagrammatic view in cross-section through a vertical plane, of a part of a primary pump equipped with a device for thermal protection in the region of its passage through the slab.

FIG. 1a is a perspective view of the shells of the device for thermal protection shown in FIG. 1.

FIG. 2 is a view in cross-section through a vertical plane, of a part of an intermediate exhanger equipped with a device for thermal protection according to the invention, in the region of its passage through the slab.

FIG. 2a is a partial view in perspective of one of the shells forming the device for thermal protection.

FIG. 2b is a partial view in perspective of the other shell forming the device for thermal protection.

DETAILED DESCRIPTION

FIG. 1 shows a part of the slab 1 of a fast-neutron nuclear reactor in the region of a pump passage 2 consisting of a shell extended to some height above the upper surface of the slab 1 and carrying a supporting flange 3 for the component. The component consists of a primary pump 4 the lower part of which (not shown) is immersed under the level 45 of the liquid sodium filling the reactor vessel closed with the slab 1. The outer cylindrical casing of the pump 4, which is the only component of this pump which is shown, is integrally fixed to a bearing flange 5 resting on the supporting flange 3, when the pump is in an operating position as shown in FIG. 1.

The upper part of the pump including, in particular, its driving motor, has not been shown. The diameter of the outer cover of the pump 4 is appreciably smaller than the inner diameter of the passage 2, with the result that an annular space is provided between the pump 4 and the passage 2.

The argon blanket fills the volume situated between the top level 45 of the liquid sodium and the lower surface of the slab 1. This argon also enters the annular space around the component 4.

A first shell 10 is fixed under the bearing flange 5 of the component so as to be coaxial with this component 4 and the passage 2, the common axis of these elements being the vertical axis ZZ'.

A second shell 11, coaxial with shell 10, and with a diameter which is very slightly greater, is fixed on the latter in its top part by means of a welded crown ring 12.

As can be seen in FIG. 1a, the first shell 10 includes in its part situated above the second shell 11 openings 14 distributed in an annular zone with axis ZZ' all around this shell 10.

The outer cover of pump 4 is heated by conduction, the lower part of the pump, which includes its active part, being immersed in the liquid sodium. In contrast, the volume of the slab remains at a moderate temperature. Shells 10 and 11 make it possible to avoid an intensive heat transfer by radiation between the surface of the outer cover of the pump 4 and the passage 2.

The shells 10 and 11 also divide the annular space between pump 4 and passage 2 into two annular spaces 7a and 7b, both of these spaces communicating in their lower part with the argon blanket situated above the liquid sodium level 45, and communicating together, in their upper part, by the openings 14 in the shell 10. The argon blanket, which is at a temperature of the order of 350°, i.e., at a temperature intermediate between the temperature of the outer surface of the pump and temperature of the slab, rises in the inner space 7b and is heated in contact with the pump, then is stopped by the flange 5 and comes down again into the space 7a, where this gas is cooled in contact with the passage shell 2. A natural circulation of argon is thus established, in the direction of the arrows 13 which can be seen in FIG. 1.

This natural circulation takes place in an identical manner over the whole periphery of the pump and of the passage 2. Some cooling of the outer cover of the pump and restricted heating of the passage 2 are therefore produced, at the same time as an equalization of the temperature over the entire height of the passage.

In the case of a pump whose outer cover temperature is relatively moderate, it would be possible to obtain sufficient thermal protection by employing a single shell, the second shell making it possible, however, to restrict further the exchanges by radiation and to produce a zone of stagnant argon for insulation between shells 10 and 11.

In the case of a component whose outer surface is at a very high temperature, such as an intermediate exchanger, such an arrangement with double protective shells is essential.

FIG. 2 shows a part of the reactor slab 1 incorporating a passage 14a having a supporting flange 15 permitting the insertion and the installation of an intermediate heat exchanger whose outer cover 16 has a bearing flange 17 resting on the supporting flange 15 when the intermediate heat exchanger is in an operating position as shown in FIG 2.

The intermediate heat exchanger includes an upper tube plate 18 fixed to the lower part of the cover 16, a tube bundle 19 immersed in the liquid sodium, only the top part of which is shown, and a bundle cover 20 pierced by a sodium entry window 21 in its upper part.

In its top part, the outer cover 16 of the intermediate exchanger is connected to an inner cover 23 by a component of revolution with a Y-shaped cross-section.

Between the cover 16 and the cover 23 is placed a thermally insulating material 24 making it possible to restrict the heat loss through the wall of the intermediate exchanger.

The intermediate exchanger incorporates in its middle part a tubular conduit 25 coaxial with the cover 16, communicating in its lower (not shown) with a chamber communicating with the entry face of the lower tube plate of the tube bundle 19 (not shown).

The conduit 25 permits the delivery of the "cold" secondary sodium coming from a steam generator of the nuclear reactor. This "cold" secondary sodium is distributed into the bundle 19, where it comes into thermal contact with the primary sodium present in the vessel up to the level 45, which causes heating of the secondary sodium up to a temperature of 525°. To come into thermal contact with the secondary sodium, the primary sodium enters the bundle cover 20 through window 21 and leaves again through a lower window (not shown).

The high-temperature secondary sodium which leaves the bundle 19 passes through the annular space between the outer cover 16 and the inner tube 25 following the direction of the arrows 27. The outer wall 16 of the intermediate exchanger is thus at a high temperature.

A cylindro-conical shell 28 is arranged coaxially relative to the exchanger and relative to the passage 2, all these components having a common vertical axis ZZ'. Shell 28 is connected to the bearing flange 17 of the intermediate exchanger by means of suspension rods 29, connecting rods 30 and hooking components 31. The suspension rods 29 permit the movement in vertical translation of the cylindro-conical shell 28 between the high position shown in FIG. 2 and a low position in which the lower cylindrical part 28a of the shell 28 masks the window 21 for entry of the primary sodium into the bundle 19. This part 28a of shell 28 thus forms the closing shutter of the intermediate exchanger. Such movable shutters suspended from long suspension rods are generally employed to close the primary sodium inlet opening and to put the intermediate exchanger into its non-operational state.

The thermal protection device also incorporates an inner shell 34 fixed rigidly under the flange 17 of the intermediate exchanger.

As can be seen in FIG. 2a, which shows a part of the upper cylindrical section of the shell 28, the latter is pierced with openings 36 in a crown ring with axis ZZ' over its entire circumference. When shell 28 is in a high position, the shutter 28a being open and the intermediate exchanger in operation, the openings 36 are at the level of the lower part of the reactor slab 1.

As can be seen in FIG. 2b, the inner shell 34 is pierced with openings 38 arranged as an annular zone over the entire periphery of the upper part of this shell. The same applies, moreover, to shell 28 whose upper cylindrical part is pierced with openings 40. FIG. 2b can represent the upper part of either shell 28 or shell 34. Above the openings 40, shell 28 carries a ring 41 which forms a stop for this shell 28 at the end of an upward motion, by virtue of the suspension rods 29, when the intermediate exchanger is put into operation. The ring 41 then comes into abutment on the lower surface of the flange 17 of the exchanger which is integrally fixed to the outer wall 16 of this exchanger.

When the intermediate exchanger is in operation, during operation of the nuclear reactor, the upper level 45 of the liquid sodium in the reactor vessel is under a blanket layer of argon which is at a temperature of the order of 350° C. This argon blanket also fills the annular spaces included between the intermediate exchangers and the corresponding passages through the slab. Secondary sodium heated up to 525° C. rises through the intermediate exchanger through its peripheral part following the path of the arrows 27.

The shells 28 and 34 divide the annular space included between the wall 16 of the intermediate exchanger, which is at a high temperature, and the passage 14 into three annular spaces 36a, 36b and 36c. The two shells 28 and 34 reduce the flux of thermal radiation between the wall 16 of the exchanger and the passage 14.

The wall 16 of the intermediate exchanger is at a temperature of 525°, while the slab is at a temperature of 100°.

Argon at 350° coming into contact with the wall 16 at the base of the annular space 36 is heated and rises in the inner part 36a of the annular space while being heated, then reaches the top part of the shell 34 where this heated argon passes through the openings 38 and 40 in the shells 34 and 28, respectively, to come into contact with the passage 14 in the part 36c of the annular space 36. The argon then travels back down, while cooling, as far as the lower openings 36 in the shell 38, and then re-enters part 36a of the annular space. Natural circulation of argon along the arrows 35 is thus set up. This natural circulation results in circumferential equalizing of the temperature of the outer wall 16 of the exchanger.

The main advantages of the device according to the invention are to permit a restriction of the thermal radiation flux between the outer wall of a component of the nuclear reactor and the corresponding passage to a very low level, and a natural circulation of argon between the component and the corresponding passage, which leads to better temperature distribution in the passage and in the slab.

In the case of an intermediate exchanger, the use of one of the shells of the protective device to form the shutter for closing the top window of the intermediate exchanger leads to a simplification of the mechanism controlling the closing shutter and an increase in the reliability of this mechanism. In fact, the shutter control rods can be much shorter than those in prior art devices, where these rods had to arrive at a point arranged above the flange of the component with the shutter situated in the region of the upper part of the bundle. The shutter control system is also more rigid, and its guidance is better assured by virtue of the presence of a shell over the entire height of the passage.

In the case of an intermediate exchanger, the outer shell, which at the same time forms the movable shutter of the intermediate exchanger can come into high abutment against a part of the inner shell at some distance below the flange supporting the component. As a result, a space is maintained above this outer shell and below the bearing flange for the component, for the passage of naturally circulating argon. It is therefore unnecessary to provide openings in the upper part of the outer shell. In general, it is not always necessary to provide openings either in the lower part or in the upper part of the shell or shells forming the protective device, the length of these shells and their position relative to the slab or to the bearing flanges downwards and upwards being capable of permitting passage of argon below or above these shells. In every case, however, an argon passage must be provided over the entire periphery of the protective shells.

According to the type of component and the outer temperature of this component, it will be possible to employ only one or two protective shells dividing the annular space between component and passage into two or three annular parts.

In the case where two coaxial protective shells are employed, the central space bounded by these two shells is filled with argon but this argon cannot circulate, with the result that it forms a stagnant layer at a temperature which is intermediate between the temperature of the two shells.

Finally, the invention applies to any component of a fast-neutron nuclear reactor incorporating a vessel filled with liquid metal closed with a horizontal slab and passing through such slab. The invention applies in particular to integrated nuclear reactors cooled with liquid sodium, as well as loop-type fast-neutron nuclear reactors or in the case of nuclear reactors incorporating not only intermediate exchangers but also integrated steam generators.

We claim:

1. In a fast neutron nuclear reactor comprising a reactor slab having a thickness, a vessel filled with liquid metal, a layer of neutral blanket gas disposed between said reactor slab and said liquid metal, at least one cylndrical passage with a vertical axis passing through said slab and at least one component of general cylindrical shape arranged with its axis vertical, equipped with a flange for bearing on said slab and disposed in the passage through said slab for entering said reactor vessel so that an annular space is formed between said component and said slab, the improvement consisting of a thermal protection device for said component comprising at least one shell of a diameter smaller than the inner diameter of said passage but greater than the diameter of a part of said component situated in said passage, of a length greater than the length of said passage, i.e., the thickness of said slab, connected to said flange of said component in its top part so as to divide said annular space between said component and said passage into two annular spaces communicating with each other only in the vicinity of the lower part of said slab and in the upper part of said shell below said flange of said component, by at least one set of openings passing through said shell in an annular zone of the latter, with a vertical axis the convection currents of the neutral gas circulating in the annular spaces between said component and said slab being thus channelled and regulated.

2. The improvement claimed in claim 1, which incorporates two coaxial shells (10, 11-28, 34) dividing the annular space between the component (4, 16) and the passage (2, 14) into three coaxial annular spaces (7, 36).

3. The improvement claimed in claim 2, wherein one of the shells (11) is fixed rigidly to the other shell (10) which is itself fixed to the lower part of the bearing flange (5) of the component, openings (14) being provided in the wall of the shell (10) fixed on the bearing flange, (5) above the second shell (11).

4. The improvement claimed in claim 2, wherein the lower part of the shells (10, 11) is at the level of the lower part of the slab (1).

5. The improvement claimed in claim 1, in the case where the component (16) is an intermediate exchanger of the nuclear reactor, which incorporates a shell (28) connected to the bearing flange (17) of the intermediate exchanger by supporting rods (29) movable in vertical translation for moving the shell (28) between a high position in which this shell occupies the entire height of the annular space between the exchanger (16) and the slab (1), openings (36) in the shell (28) being then at the level of the lower part of the slab (1) and a low position in which the lower part of an shell (28) closes the inlet window (21) of the intermediate exchanger (16) and thus forms its closing shutter.

6. The improvement claimed in claim 5, wherein, in its high position, the shell (28) abuts with its upper part (41) against the lower face of the bearing flange (17) of the intermediate exchanger (16) and incorporates in its upper part openings (40) over its entire periphery.

7. The improvement claimed in claim 5, which incorporates a second shell (34) coaxial with shell (28) and smaller in diameter, fixed rigidly under the bearing flange (17) of the heat exchanger and incorporating openings (38) in its upper part over its entire periphery.

8. The improvement claimed im claim 5, wherein the movable shell (28) bears in its high position on an abutment attached integrally to said second shell (34) at some distance below the bearing flange (17) of the heat exchanger.

* * * * *